(12) United States Patent
Desjardins (10) Patent No.: US 12,158,111 B2
(45) Date of Patent: Dec. 3, 2024

(54) PLANETARY GEARBOX FOR GAS TURBINE ENGINE

(71) Applicant: Pratt & Whitney Canada Corp., Longueuil (CA)

(72) Inventor: Michel Desjardins, St-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/138,508

(22) Filed: Apr. 24, 2023

(65) Prior Publication Data

US 2023/0258133 A1    Aug. 17, 2023

Related U.S. Application Data

(63) Continuation of application No. 17/519,963, filed on Nov. 5, 2021, now Pat. No. 11,635,029, which is a continuation of application No. 15/429,976, filed on Feb. 10, 2017, now Pat. No. 11,174,782.

(51) Int. Cl.

| | |
|---|---|
| F02C 7/36 | (2006.01) |
| F02C 3/107 | (2006.01) |
| F02C 6/20 | (2006.01) |
| F02C 7/32 | (2006.01) |
| F02K 3/06 | (2006.01) |
| F16H 1/28 | (2006.01) |
| F16H 57/08 | (2006.01) |

(52) U.S. Cl.
CPC ............... *F02C 7/36* (2013.01); *F02C 3/107* (2013.01); *F02C 6/206* (2013.01); *F02C 7/32* (2013.01); *F02K 3/06* (2013.01); *F16H 1/28* (2013.01); *F16H 57/08* (2013.01); *F05D 2260/40311* (2013.01); *F16H 2001/2881* (2013.01); *F16H 2001/289* (2013.01); *Y02T 50/60* (2013.01)

(58) Field of Classification Search
CPC .. F02C 7/36; F02C 6/206; F02C 3/107; F02C 7/06; F02C 7/32; F05D 2260/40311; F05D 2220/323; F16H 1/28; F16H 57/08
See application file for complete search history.

(56) References Cited

U.S. PATENT DOCUMENTS

| 3,307,433 A | * | 3/1967 | Bennett | F16H 1/46 74/411 |
| 3,969,956 A | * | 7/1976 | Hanslik | F16H 1/22 366/100 |
| 4,513,637 A | | 4/1985 | Hirt | |

(Continued)

FOREIGN PATENT DOCUMENTS

GB      2256025 A  * 11/1992  ........... F16H 1/2809

*Primary Examiner* — Craig Kim
(74) *Attorney, Agent, or Firm* — Getz Balich LLC (57) ABSTRACT

A planetary gearbox is provided that includes a sun gear, a plurality of planet gear assemblies, each planet gear assembly having a main gear meshed with the sun gear, a fore lateral gear and an aft lateral gear disposed on opposite sides of the main gear and rotating therewith, a planet carrier rotatably supporting at least some of the planet gear assemblies, and at least one fore ring gear meshed with the fore lateral gears, at least one aft ring gear meshed with the aft lateral gears, wherein one of the sun gear, the planet carrier, and the ring gears is configured to be operatively connected to an input, one is configured to be operatively connected to an output, and rotation of a remaining one is limited.

17 Claims, 5 Drawing Sheets

(56) References Cited

U.S. PATENT DOCUMENTS

| | | | |
|---|---|---|---|
| 4,983,152 A | 1/1991 | Kimberlin | |
| 5,310,391 A * | 5/1994 | Takahashi | F16H 1/2809 |
| | | | 475/338 |
| 5,472,383 A * | 12/1995 | McKibbin | F16H 57/0482 |
| | | | 184/6.12 |
| 5,528,960 A * | 6/1996 | Nagao | F16H 1/22 |
| | | | 74/665 GD |
| 6,966,865 B2 * | 11/2005 | Drago | F16H 1/28 |
| | | | 475/342 |
| 7,963,190 B2 * | 6/2011 | Sullivan | F16H 1/08 |
| | | | 74/640 |
| 8,015,900 B2 * | 9/2011 | Gmirya | F16H 1/22 |
| | | | 74/413 |
| 8,939,714 B1 * | 1/2015 | McCune | F02C 7/36 |
| | | | 415/122.1 |
| 10,006,520 B2 | 6/2018 | Ligata | |
| 10,234,011 B2 * | 3/2019 | Meffert | F16H 55/17 |
| 10,519,871 B2 * | 12/2019 | Desjardins | F01D 25/162 |
| 10,619,717 B2 | 4/2020 | Modrzejewski | |
| 10,662,879 B2 | 5/2020 | Desjardins | |
| 10,683,773 B2 * | 6/2020 | Savaria | F16H 57/0479 |
| 11,174,782 B2 * | 11/2021 | Desjardins | F02C 6/206 |
| 11,174,916 B2 * | 11/2021 | Desjardins | F16H 57/08 |
| 11,242,925 B2 | 2/2022 | Di Giovanni | |
| 2009/0062058 A1 * | 3/2009 | Kimes | F16H 1/28 |
| | | | 475/344 |
| 2009/0090096 A1 * | 4/2009 | Sheridan | F02C 7/36 |
| | | | 60/226.3 |
| 2009/0227415 A1 * | 9/2009 | Buelna | F16H 1/227 |
| | | | 475/346 |
| 2009/0277299 A1 * | 11/2009 | Gmirya | F16H 1/22 |
| | | | 74/665 A |
| 2011/0124461 A1 * | 5/2011 | Torii | F16H 57/082 |
| | | | 475/159 |
| 2012/0071288 A1 * | 3/2012 | Dalenberg | F16H 57/08 |
| | | | 475/159 |
| 2013/0192264 A1 * | 8/2013 | McCune | F02K 3/06 |
| | | | 74/395 |
| 2021/0388770 A1 * | 12/2021 | Hrubec | F16H 57/082 |

* cited by examiner

PLANETARY GEARBOX FOR GAS TURBINE ENGINE

This application is a continuation of U.S. patent application Ser. No. 17/519,963 filed Nov. 5, 2021, which is a continuation of U.S. patent application Ser. No. 15/429,976 filed Feb. 10, 2017, now issued as U.S. Pat. No. 11,174,782, both of which are hereby incorporated by reference herein in their entirety.

TECHNICAL FIELD

The application generally relates to aircraft engines and, more particularly, to gearboxes used in an aircraft engine such as a gas turbine engine.

BACKGROUND OF THE ART

Turboprops are gas turbine engines coupled to a propeller via a reduction gearbox. Contrary to a turbofan engine, in which energy from the jet is used to generate thrust, a turboprop turbine converts this energy in mechanical energy. The turbine is then used to drive the propeller. However, the rotational speed of the turbine is too high to be directly coupled to the propeller. Accordingly, a reduction gearbox is used to reduce the rotational speed of the propeller relative to the turbine and to increase the torque generated by the turbine. Gearboxes add weight and complexity to the engine, and room for improvement exists.

SUMMARY

In one aspect, there is provided a planetary gearbox, comprising a sun gear, a plurality of planet gear assemblies, each planet gear assembly having a main gear meshed with the sun gear, a fore lateral gear and an aft lateral gear disposed on opposite sides of the main gear and rotating therewith, a diameter of the main gear being different than a diameter of the fore and aft lateral gears, a planet carrier rotatably supporting at least some of the planet gear assemblies, and at least one fore ring gear meshed with the fore lateral gears, at least one aft ring gear meshed with the aft lateral gears, wherein one of the sun gear, the planet carrier, and the ring gears is configured to be operatively connected to an input, one is configured to be operatively connected to an output, and rotation of a remaining one is limited.

In another aspect, there is provided a gas turbine engine comprising a compressor, a combustor and a turbine, the turbine having a first section for driving the compressor and a second section driving a load, the second section of the turbine operatively connected to a sun gear of a planetary gearbox, the sun gear meshed with main gears of a plurality of planet gear assemblies pivotally mounted on a planet carrier, the planet gear assemblies each having a fore lateral gear and an aft lateral gear of a diameter different than a main gear diameter, the fore and aft lateral gears disposed on opposite sides of the main gears, at least one fore ring gear meshed with the fore lateral gears, at least one aft ring gear meshed with the aft lateral gears, one of the ring gears and the planet carrier driving the load by rotation, while rotation of another one of the ring gears and the planet carrier is limited.

In yet another aspect, there is provided a method for changing a rotational speed of a first rotating component relative to a second rotating component, comprising receiving a torque from the first rotating component using a sun gear; transmitting at a first rotational speed ratio a rotation of the sun gear to a plurality of main gears of a plurality of planet gear assemblies rotatably mounted onto a planet carrier, transmitting at second rotational speed ratio a rotation of the main gears to one of the planet carrier and ring gears while limiting rotation of another one of the planet carrier and the ring gears, the ring gears meshed to gears disposed on opposite sides of and rotating with the main gears, and dividing between the ring gears a load transmitted from the second rotating component.

DESCRIPTION OF THE DRAWINGS

Reference is now made to the accompanying figures in which.

DETAILED DESCRIPTION

Figure 1:
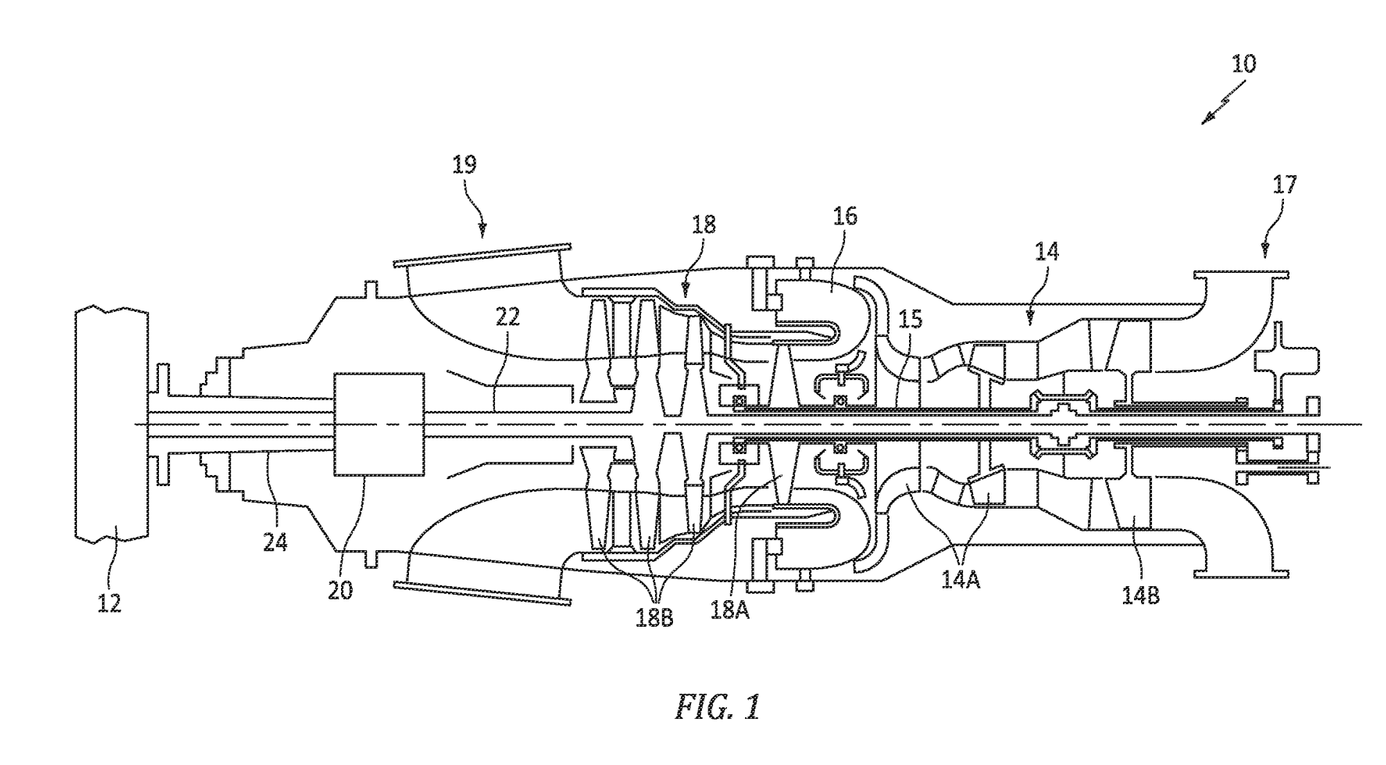
FIG. 1 is a schematic cross-sectional view of a gas turbine engine.

FIG. 1 illustrates a gas turbine engine 10 of a type preferably provided for use in subsonic flight and configured for driving a load 12, such as, but not limited to, a propeller or a helicopter rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The exemplary embodiment shown in FIG. 1 is a "reverse-flow" engine because gases flow from the inlet 17, at a rear portion of the engine 10, to the exhaust outlet 19, at a front portion of the engine 10. This is in contrast to "through-flow" gas turbine engines in which gases flow through the core of the engine from a front portion to a rear portion. The engine 10 may be a reverse-flow engine (as illustrated) or a through-flow engine.

In the illustrated embodiment, the turbine section 18 has a high-pressure turbine 18A in driving engagement with a high-pressure compressor 14A. The high-pressure turbine 18A and the high-pressure compressor 14A are mounted on a high-pressure shaft 15. The turbine 18 has a low-pressure turbine, also known as power turbine 18B configured to drive the load 12. The power turbine 18B is configured to drive a low-pressure compressor 14B through a low-pressure shaft 22. A reduction gearbox 20 is configured to connect the low-pressure shaft 22 that supports the power turbine 18B to a shaft 24 that is in driving engagement with the load 12, while providing a reduction speed ratio therebetween.

The reduction gearbox 20 allows the load 12 to be driven at a given speed, which is different than the rotational speed of the low-pressure turbine 18B. The reduction gearbox 20 allows both the load 12 and the low-pressure turbine 18B to rotate at their respective optimal speed which are different. In the embodiment shown, the reduction gearbox 20 is axially mounted at the front end of the engine 10.

Now referring to FIGS. 1-4, the reduction gearbox 20 comprises a planetary gearbox 30, also known as epicyclic gear train, epicyclic gearbox, etc., but referred to as a planetary gearbox 30 herein for clarity. The planetary gearbox 30 has a sun gear 32 mounted on a sun gear connector 34 configured to be connected to a layshaft 22a that is connected the low-pressure shaft 22. In an alternate embodiment, the sun gear 32 is mounted directly onto the layshaft 22a that is connected to the low-pressure shaft 22. The layshaft 22a, also known as a torque shaft, is configured to allow flexibility from deflection or other contributor between the turbine section 18 and the reduction gearbox 20. In operation, the layshaft 22a is designed to twist along its rotational axis by a certain amount. The twist of the layshaft 22a is monitored to indicate the actual torque that it transmits. The planetary gearbox 30 further has a set of planet gear assemblies 36 rotatably mounted on shafts 38—three planet gear assemblies 36 are shown, although the planetary gearbox 30 could have two or more planet gear assemblies 36. In the embodiment shown, all shafts 38 of the set of planet gear assemblies 36 are connected to a planet carrier 40, the planet gear assemblies 36 rotating onto the shafts 38. In a particular embodiment, the planetary gearbox 30 comprises a plurality of planet gear assemblies 36. At least some of the plurality of assemblies 36 are mounted on the planet carrier 40, while others may simply rotate while not being connected to the planer carrier 40. In the illustrated embodiment, bearings 42 are disposed between the shafts 38 and the planet gear assemblies 36. The bearings 42 are shown as plain or oil film bearings. In an alternate embodiment, rolling element bearings may be used among other possible arrangements. In the illustrated embodiment, the planet carrier 40 has a connector 44 adapted to be coupled to the shaft 24 of the load 12. Alternatively, the planet carrier 40 may be mounted directly to the shaft 24. In an alternate embodiment, the planet carrier 40 is a zero-twist carrier to reduce twist deflection under torque by driving the planet gear assemblies 36 from an axial position corresponding to a symmetry plane of the planet gear assemblies 36. In a particular embodiment, the zero-twist carrier is as described in U.S. Pat. No. 6,663,530 which is incorporated herein by reference in its entirety. Alternatively, stiffness of the shaft 38 may be varied to reduce the deflection that is transmitted to the planet gear assemblies 36.

Figure 2:
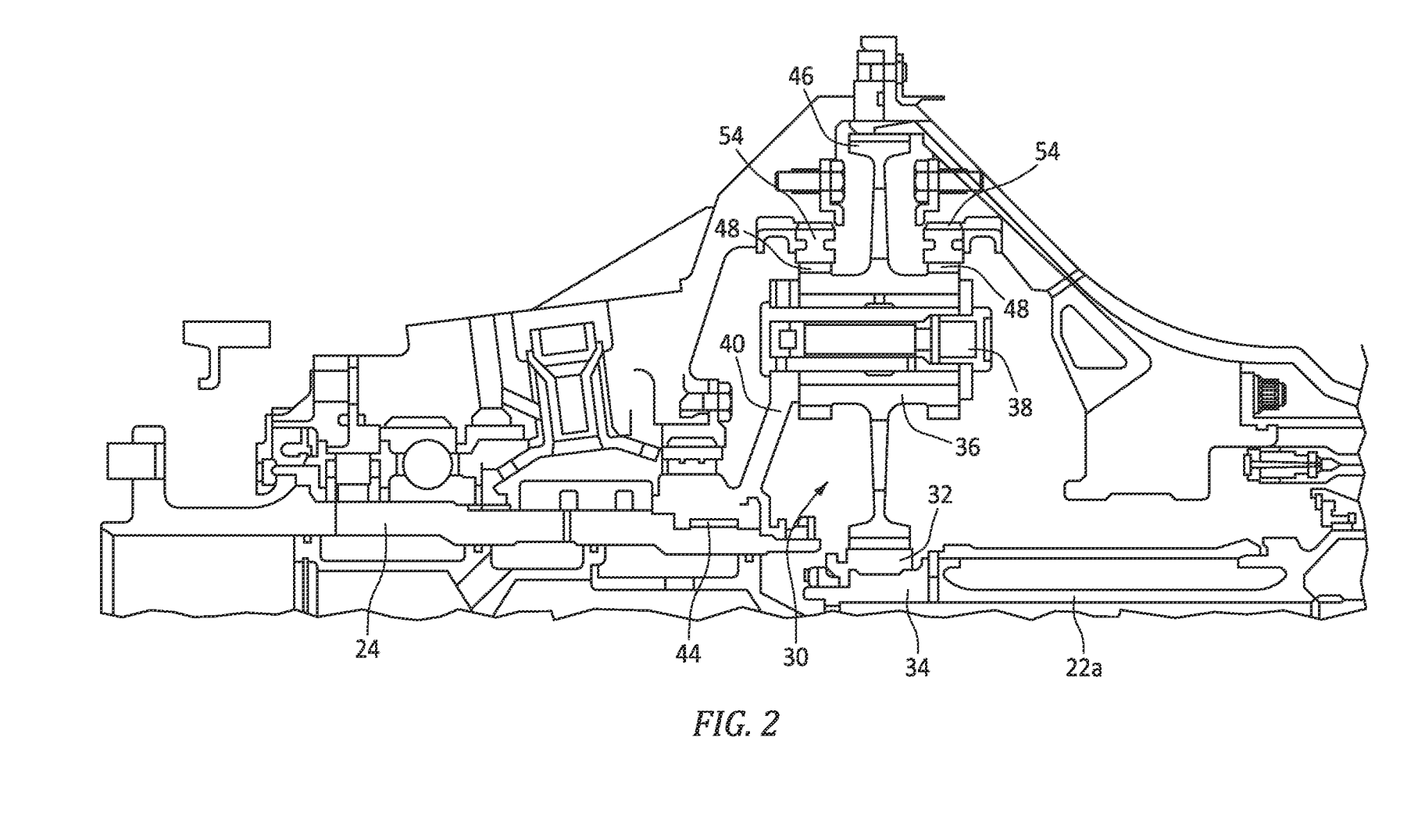
FIG. 2 is a cross-sectional view of a portion of the gas turbine engine illustrating a planetary gearbox.
Figure 3:
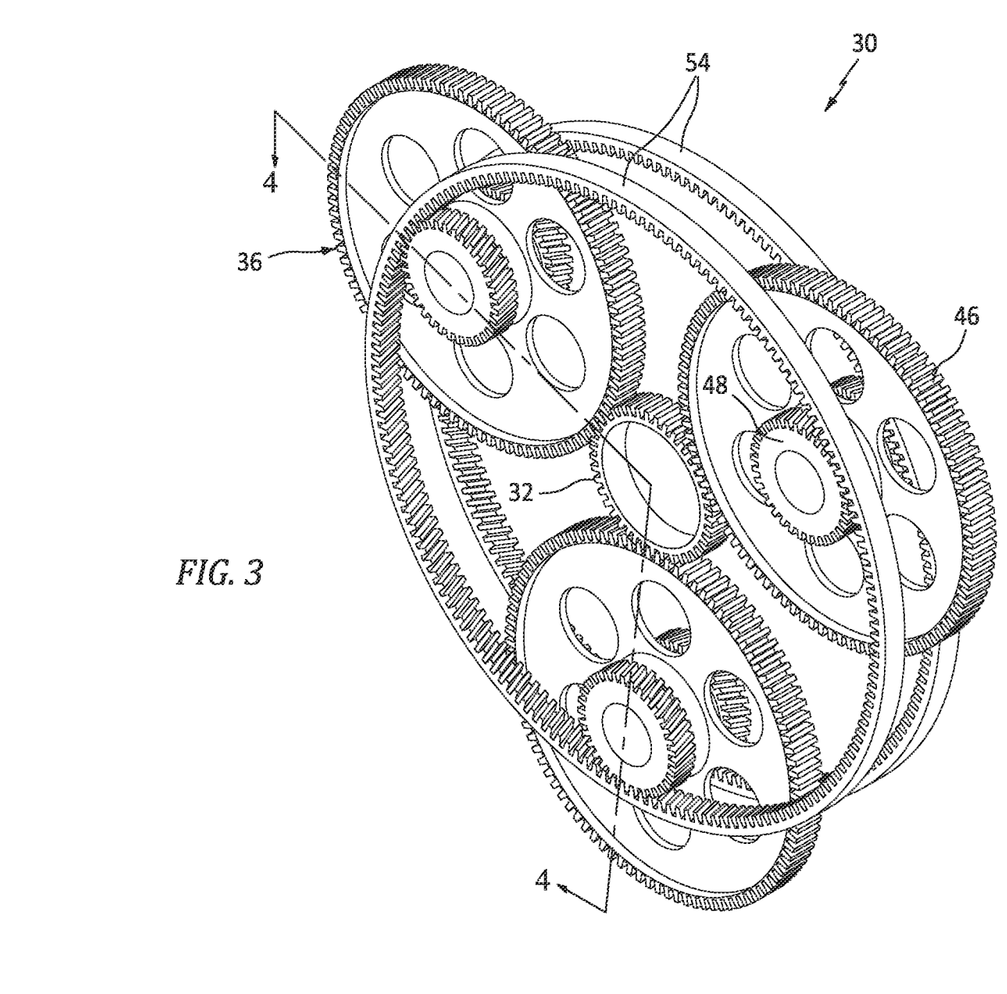
FIG. 3 is a tri-dimensional view of the planetary gearbox of FIG. 2.
Figure 4:
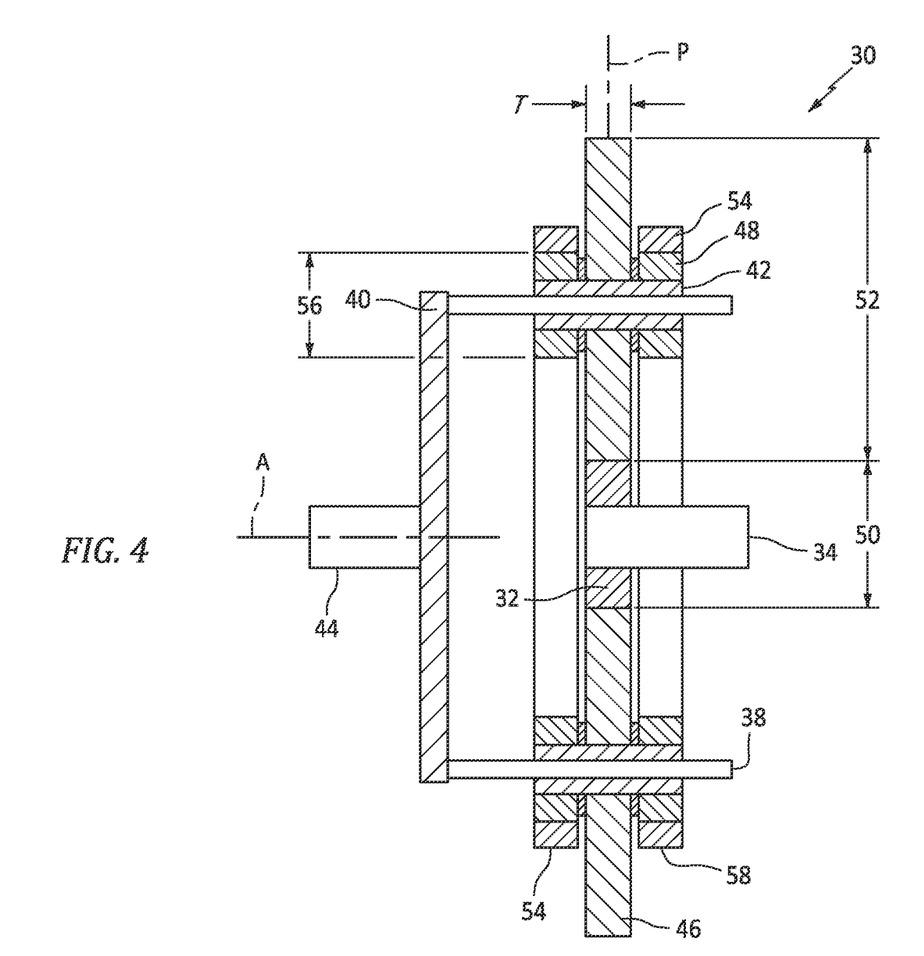
FIG. 4 is a cross-sectional view along line 4-4 of the planetary gearbox of FIG. 3.

Each planet gear assembly 36 has a main gear 46, a fore and aft lateral gears 48 disposed on opposite sides of the main gear 46. In some embodiments, as shown in FIG. 2, a main gear 46 and respective fore and aft lateral gears 48 are a monolithic structure. The fore and aft lateral gears 48 rotate integrally with the main gears 46. The main gears 46 are meshed with the sun gear 32. In the illustrated embodiment, the main gears 46 and the sun gear 32 are spur gears, but other types of gears may be used, such as helical gears. In the embodiment shown, a diameter 50 of the sun gear 32 is inferior to a diameter 52 of the main gears 46 to create a first rotational speed ratio to the planetary gearbox 30, between the sun gear 32 and the main gears 46 of the planet gears assemblies 36.

Figure 5:
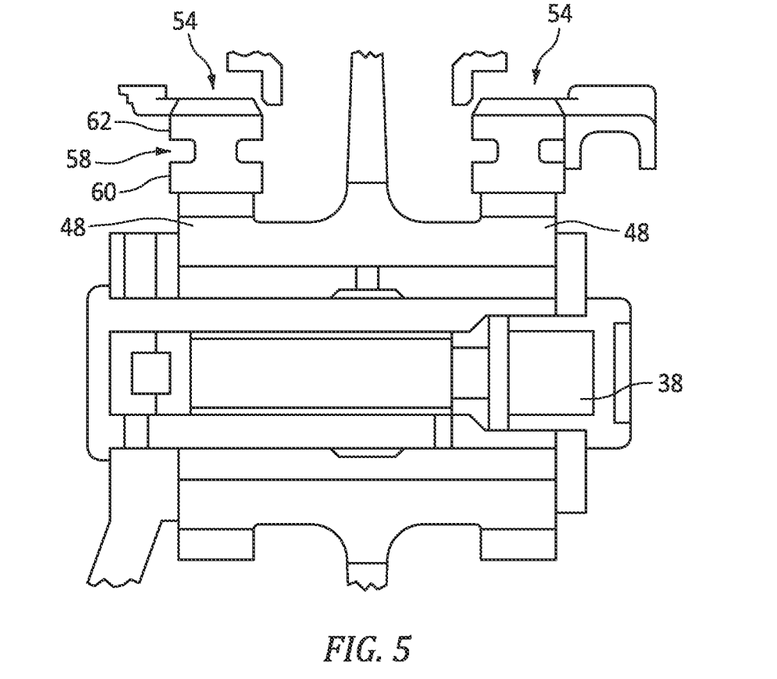
FIGS. 5 and 5A are enlarged partial view of a portion of FIG. 2.
Figure 5A:
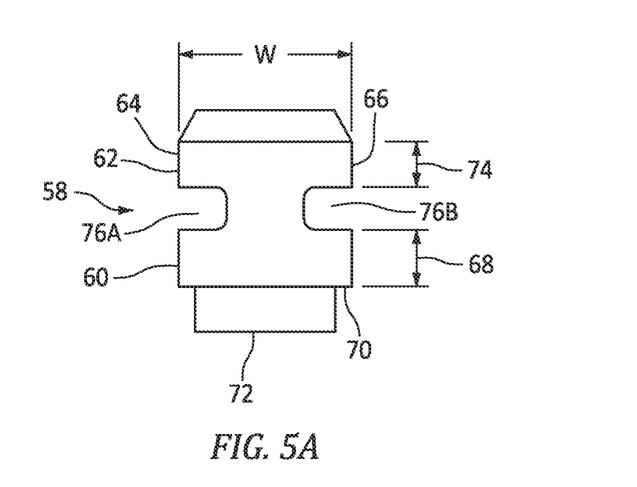

Ring gears 54 are meshed with the fore and aft lateral gears 48 of the planet gears assemblies 36. The ring gears 54 consist of two halves and are disposed symmetrically on each side of the main gears 46 so that the reaction load on the bearings 42 is equalized along their longitudinal axis. The gears 48 and 54 may be spur gears (internal spur gear in the case of the ring gear 54). In the illustrated embodiment, the lateral gears 48 and the ring gears 54 are helical gears. Helical gears may be quieter. In a particular embodiment, teeth of the fore lateral gear are angled in an opposite way relative to teeth of the aft lateral gear such that the fore and aft lateral gears are mirrored relative to one another. In operation, the main gears 46 of such a particular embodiment self-center under torque relative to the sun gear 32. This may enhance the load sharing between the ring gears 54. In the embodiment shown, a diameter 56 of the lateral gears 48 is inferior to the diameter 52 of the main gears 46. Accordingly, a second rotational speed ratio between the planet gear assemblies 36 and the ring gears 54, or between the planet gears assemblies 36 and the planet carrier 40, is generated in the planetary gearbox 30. Referring to FIGS. 2, 5, and 5A, each ring gear 54 has a body that includes a web 58, an inner rim 60, an outer rim 62, a first lateral side surface 64, a second lateral side surface 66, and a width W. The inner rim 60 is disposed radially inside of the outer rim 62. The web 58 extends between the inner and outer rims 60, 62. The inner rim 60 has a radial height 68 and an inner radial surface 70. The teeth 72 that mesh with the fore and aft lateral gears 48 extend radially inwardly from the inner radial surface 70. The outer rim 62 has a radial height 74. In the embodiment shown in FIGS. 2, 5, and 5A, the ring gear 54 body includes a first channel 76A disposed on the first lateral side 64 of the ring gear body and a second channel 76B disposed on a second lateral side 66 of the ring gear body. The first channel 76A and the second channel 76B are shown aligned with one another. The first and second channels 76A, 76B create a narrowed width portion of the web 58 therebetween.

The planetary gearbox 30 provides a rotational speed ratio between the sun gear 32 and the planet carrier 40 that would require at least two conventional planetary gearboxes to achieve. In a particular embodiment, less moving parts are required which may lead to cost and weight reduction of the gas turbine engine 10. Furthermore, the moving parts of such gearbox require lubrication. By having fewer parts, less oil may be required. This may reduce the capacity of the required oil system and because less heat is generated, the size of the required heat exchanger used to cool down the oil of the reduction gearbox 20 may be reduced. In a particular embodiment, a total length of the gas turbine engine 10 may be reduced by having the planetary gearbox 30 as described herein instead of at least two conventional gearboxes disposed in series to achieve a speed reduction ratio equivalent to the one of the planetary gearbox 30.

In the illustrated embodiment, the turbine shaft 22 is connected to the sun gear 32. The propeller shaft 24 is connected to the connector 44 of the planet carrier 40, for instance by spline connection. In such an embodiment, corresponding to a planetary arrangement, rotation of the ring gears 54 is limited as the ring gears 54 are fixed to a structure of the gas turbine engine 10 as shown in FIG. 2. It is understood that limiting rotation of the ring gears 54 comprises completely blocking the rotation of said ring gears. The speed reduction ratio is defined as the rotational speed of the shaft 22 over the rotational speed of the shaft 24. Such an embodiment provides the highest speed reduction ratio and the highest torque increase between the shafts 22 and 24 that is possible to achieve with the planetary gearbox 20. In this arrangement, the shafts 22 and 24 rotate in the same direction relative to one another.

In an alternate embodiment, a star arrangement may be used. In a star arrangement, rotation of the planet carrier 40 is limited and the propeller shaft 24 is operatively connected to the ring gears 54. It is understood that limiting rotation of the planet carrier 40 comprises completely blocking the rotation of said carrier. In this alternate embodiment, the ring gears 54 are both mounted and linked to the propeller shaft 24. The total speed reduction ratio of the star arrangement would be less than the speed reduction ratio of the fixed configuration of the ring gears 54 as described above. In this alternate embodiment, the propeller shaft 24 and the turbine shaft 22 rotate in opposite directions.

By having two ring gears 54 disposed on opposite sides of the main gears 46 the load is symmetrically distributed relative to a plane P, to which an axis of rotation A of the sun gear 32 is normal, the plane P being located halfway through a thickness T of the main gears 46. By symmetrically distributing the load, the planetary gearbox may be adapted to withstand higher torques and may be adapted to use plain bearings instead of heavier and more expensive rolling element bearings.

The planetary gearbox 30 may be used in a plurality of applications, other than gas turbine engines, in which a rotational speed ratio between two rotating components is required. In such an embodiment, an input is provided to one of the sun gear 32, the planet carrier 40, and the ring gears 54 and an output is connected to another one of the sun gear 32, the planet carrier 40, and the ring gears 54. Rotation of a remaining one of the sun gear 32, the planet carrier 40, and the ring gears 54, that is not connected to the input or the output, is limited.

The planetary gearbox 30 is adapted to change a rotational speed of a rotating component relative to another rotating component. In the illustrated embodiment, the rotating component is the low-pressure shaft 22 and the other rotating component is the shaft 24. In the illustrated embodiment, the shaft 24 is connected to the load 12, but it may be connected to any other suitable component such as, but not limited to, a helicopter rotor, or an accessory of the gas turbine engine 10.

To change the rotational speed of the shaft 24 relative to the shaft 22, the planetary gearbox 30 first receives a torque of the low-pressure shaft 22 via the sun gear 32. Then, the torque is transmitted to main gears 46 of a set of planet gear assemblies 36 meshed with the sun gear 32. Each planet gear assembly 36 of the set of planet gear assemblies 36 comprises aft and fore lateral gears 48 disposed on opposite sides of the main gear 46. In the illustrated embodiment, a first rotational speed ratio is generated by having a diameter 50 of the sun gear 32 inferior to a diameter 52 of the main gears 46.

The torque is then transmitted from the fore and aft lateral gears 48 to one of the planet carrier 40 and the ring gears 54 meshed with the fore and aft lateral gears 48, while another one of the planet carrier 40 and the ring gears 54 is fixed so as not to rotate. A second rotational speed ratio is generated by having the diameter 56 of the fore and aft lateral gears 48 inferior to the diameter 52 of the main gear 46. The diameters 50, 52, and 56 may be tuned to achieve the desired reduction ratio.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A planetary gearbox, comprising:
   a sun gear;
   a plurality of planet gear assemblies, each planet gear assembly having a main gear meshed with the sun gear, a fore lateral gear and an aft lateral gear disposed on opposite sides of the main gear and rotating therewith, the main gear having a first diameter and the fore and aft lateral gears having a second diameter; and
   at least one ring gear meshed with the fore lateral gears or the aft lateral gears, the at least one ring gear having a body defined by a first lateral side surface and a second lateral side surface disposed opposite the first lateral side surface, the body including a first channel disposed in the first lateral side and a second channel disposed in the second lateral side;
   wherein the at least one ring gear includes a web disposed between an inner rim and an outer rim, and the first channel and the second channel are aligned with one another; and
   wherein the at least one ring gear has a width that extends between the first lateral side surface and the second lateral side surface, and a portion of the web aligned with the first channel and the second channel has a web width, and the web width is less than the width of the at least one ring gear.

2. The planetary gearbox of claim 1, wherein the first diameter is greater than the second diameter.

3. The planetary gearbox of claim 1, wherein the at least one ring gear includes a fore ring gear meshed with the fore lateral gears and an aft ring gear meshed with the aft lateral gears.

4. The planetary gearbox of claim 3, wherein the fore ring gear, the fore lateral gears, the aft ring gear, and the aft lateral gears are helical gears having teeth, and the helical teeth of the fore ring gear and the fore lateral gears are angled in an opposite way relative to the helical teeth of the aft ring gear and the aft lateral gears.

5. The planetary gearbox of claim 4, wherein the sun gear and the main gears are spur gears.

6. The planetary gearbox of claim 1, wherein the at least one ring gear has a third diameter, and the third diameter is greater than the first diameter.

7. A planetary gearbox, comprising:
   a sun gear;
   a plurality of planet gear assemblies, each planet gear assembly having a main gear meshed with the sun gear, a fore lateral gear and an aft lateral gear disposed on opposite sides of the main gear and rotating therewith, the main gear having a first diameter and the fore and aft lateral gears having a second diameter; and
   at least one ring gear meshed with the fore lateral gears or the aft lateral gears, the at least one ring gear having a body that includes an inner radial rim, an outer radial rim, a web disposed between an inner rim and an outer rim, a first lateral side, and a second lateral side;
   wherein the inner radial rim and the outer radial rim each have a first width extending between the first lateral side and the second lateral side, and the web has second width extending between the first lateral side and the second lateral side, and the second width is less than the first width.

8. The planetary gearbox of claim 7, wherein the first diameter is greater than the second diameter.

9. The planetary gearbox of claim 7, wherein the at least one ring gear includes a fore ring gear meshed with the fore lateral gears and an aft ring gear meshed with the aft lateral gears.

10. The planetary gearbox of claim 9, wherein the fore ring gear, the fore lateral gears, the aft ring gear, and the aft lateral gears are helical gears having teeth, and the helical teeth of the fore ring gear and the fore lateral gears are angled in an opposite way relative to the helical teeth of the aft ring gear and the aft lateral gears.

11. The planetary gearbox of claim 10, wherein the sun gear and the main gears are spur gears.

12. The planetary gearbox of claim 7, wherein the at least one ring gear has a third diameter, and the third diameter is greater than the first diameter.

13. A gas turbine engine, comprising:
a compressor;
a combustor;
a turbine in communication with the compressor and a planetary gearbox, the planetary gearbox comprising:
a sun gear in communication with the turbine;
a plurality of planet gear assemblies, each planet gear assembly having a main gear meshed with the sun gear, a fore lateral gear and an aft lateral gear disposed on opposite sides of the main gear and rotating therewith, the main gear having a first diameter and the fore and aft lateral gears having a second diameter; and
a fore ring gear meshed with the fore lateral gears;
an aft ring gear meshed with the aft lateral gears;
wherein the fore ring gear and the aft ring gear each has a body that includes an inner radial rim, an outer radial rim, a web disposed between an inner rim and an outer rim, a first lateral side, and a second lateral side, and the inner radial rim and the outer radial rim each have a first width extending between the first lateral side and the second lateral side, and the web has second width extending between the first lateral side and the second lateral side, and the second width is less than the first width; and
a planet carrier in communication with each planet gear assembly of the plurality of planet gear assemblies, the planet carrier in communication with an output.

14. The gas turbine engine of claim 13, wherein the first diameter is greater than the second diameter.

15. The gas turbine engine of claim 14, wherein the fore ring gear and the aft ring gear have a third diameter, and the third diameter is greater than the first diameter.

16. The gas turbine engine of claim 13, wherein the fore ring gear, the fore lateral gears, the aft ring gear, and the aft lateral gears are helical gears having teeth, and the helical teeth of the fore ring gear and the fore lateral gears are angled in an opposite way relative to the helical teeth of the aft ring gear and the aft lateral gears.

17. The gas turbine engine of claim 16, wherein the sun gear and the main gears are spur gears.

* * * * *